United States Patent [19]

Merchant

[11] Patent Number: 4,692,838
[45] Date of Patent: Sep. 8, 1987

[54] FIRE PANEL WITH DOOR PROVIDING EASE OF SERVICE

[75] Inventor: David E. Merchant, Lincoln, Nebr.

[73] Assignee: Emhart Industries, Inc., Indianapolis, Ind.

[21] Appl. No.: 882,398

[22] Filed: Jul. 7, 1986

[51] Int. Cl.$^4$ .............................................. H05K 5/00
[52] U.S. Cl. ...................................... 361/380; 16/361;
16/379; 16/381; 49/176; 49/260; 312/138 R;
361/390
[58] Field of Search ................. 16/361, 364, 379, 381,
16/386; 49/176, 177, 260, 382, 388; 312/138 R,
322; 361/346, 331, 334, 340, 356–360; 390/391,
380, 395, 399

[56] References Cited

U.S. PATENT DOCUMENTS

| | | | |
|---|---|---|---|
| 726,362 | 4/1903 | Shrivell et al. | 49/260 |
| 3,786,312 | 1/1974 | Roussard | 361/356 |

FOREIGN PATENT DOCUMENTS 0445074  4/1936  United Kingdom ................. 49/260

Primary Examiner—A. D. Pellinen
Assistant Examiner—Gregory P. Thompson
Attorney, Agent, or Firm—Robert F. Meyer; Carl A. Forest

[57] ABSTRACT

A fire panel includes a housing with a rectangular opening and rectangular door covering said opening. The door is attached to the panel with a attaching elements which comprises a pair of tracks spanning the opening, each track having a t-shaped channel, and a pair of truss-headed screws attached to the door. The heads of the screws slide in the channels in the tracks permitting the door to be slid from one side of the opening to the other without detaching the door from the housing. The door permits ease of service while meeting Underwriter's Laboratories safety requirements.

7 Claims, 6 Drawing Figures

FIRE PANEL WITH DOOR PROVIDING EASE OF SERVICE

BACKGROUND OF THE INVENTION

1. Field of the Invention

The invention, in general, relates to fire panels for enclosing fire alarm and/or fire control electronics and more particularly to a fire panel having a door which lends itself to ease of servicing side-by-side panels.

2. Description of the Prior Art

Fire panels, which are generally rectangular electrical boxes enclosing the electronics for fire alarm systems, fire control systems or similar systems for emergencies or security purposes are well-known in the art. Generally, the front side of such a box is covered by a door which opens wide to provide access for installation, programming, servicing or manual operation of the system.

Fire control systems are generally divided into zones with perhaps a few to a few hundred zones in a system depending on the size of the building. If there are more than about a dozen zones, it is usually necessary to have several fire panels in a system. In large buildings there may be ten or more panels mounted together on a wall. Often several of the panels need to be serviced simultaneously in order to properly discover problems or for efficiency. In this case, the open door of one panel may obstruct access to a neighboring panel that is being serviced. Thus, it is desirable that the panel door cover be movable to avoid such obstruction. One method that has been used in the prior art to avoid such obstruction is to make the door of the panels removable. However, because doors that are removable may become lost with the result that live electrical circuits controlling critical emergency equipment are left exposed, the Underwriters Laboratories (UL) regulations require that the doors either not be removable, or that the circuits are deactivated upon removal of the doors. Deactivation itself may be a problem during servicing. Thus, it would be desirable to have a fire panel with a door that is not removable, yet may be moved to prevent obstruction of adjacent panels when the door is open.

SUMMARY OF THE INVENTION

It is an object of the present invention to provide a fire panel having a door that can be moved from one location on the panel to another without detaching it from the panel housing.

It is another object of the invention to provide a fire panel having a door that provides ease of servicing of a group of panels while meeting United Laboratories requirements.

It is a further object of the invention to provide a fire panel having a door that can be securely locked but easily opened and moved for ease of service.

The invention provides a fire panel comprising a housing having an opening; fire panel electronics within said housing; a door for closing the opening in the housing, and attaching means for attaching the door to the housing while permitting the door to be pivoted about one end and permitting the pivoting end of the door to be moved from one side of the opening to another without detaching it from the housing. Preferably, the attaching means includes at least two elongated tracks, each track having a channel having a head portion interior of the track and a neck portion connecting the head portion and the exterior of the track, wherein the attaching means further includes two attaching members each member having a head portion slideable within the head portion of one of the channels and a neck portion slideable in the neck portion of one of the channels, and wherein the attaching members are fastened to the door.

The fire panel door of the invention not only opens widely and can be moved easily when opened, but is very simple and economical to manufacture. Numerous other features, objects and advantages of the invention will become apparent from the following detailed description when read in conjunction with the accompanying drawings.

DESCRIPTION OF THE PREFERRED EMBODIMENT

Figure 1:
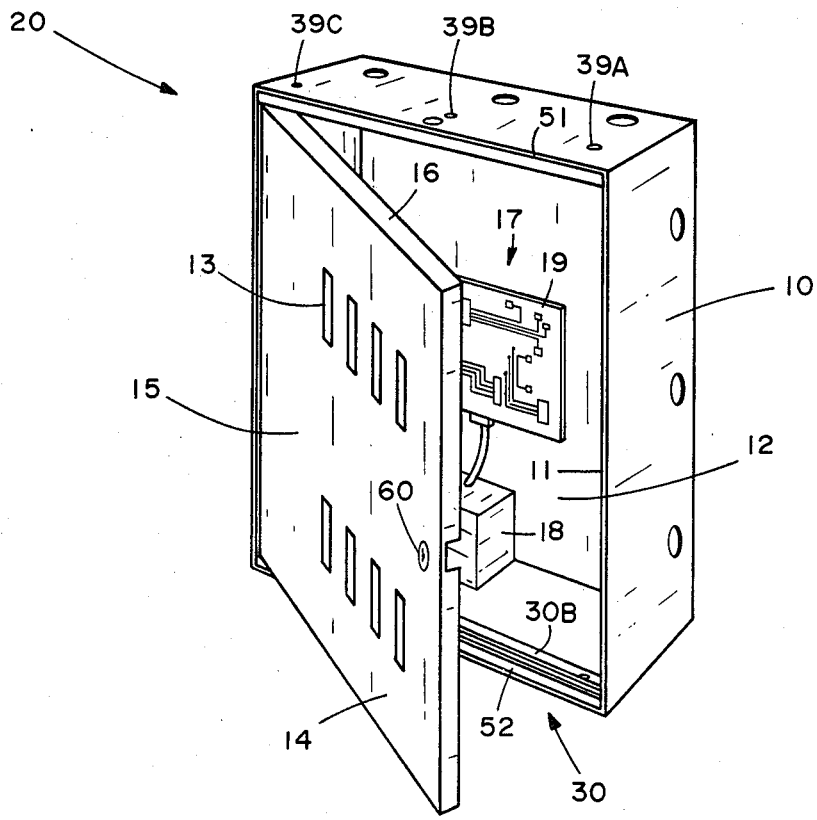
FIG. 1 is a front perspective view of the preferred embodiment of a fire panel according to the invention.

Directing attention to FIG. 1, the preferred embodiment of a fire panel according to the invention is shown. The panel includes a housing 10, having an opening 12, and a door 14 for closing the opening 12. The panel contains fire panel electronics 17 which typically includes a 24 volt battery 18 and circuit board 19, and may include control switches, relays, visual displays and other components. The door 14 is attached to the housing 10 by an attaching means 20, which in the case of the preferred embodiment includes guide means 30 and attaching member 40 (FIG. 3).

Turning now to a more detailed description of the preferred embodiment of the invention, the housing 10 is a conventional fire panel housing, comprising a rectangular box having one side open to form opening 12; door 14 comprises a rectangular plate 15 having a lip 16 which fits snuggly within the inside edge 11 of housing 10. Door 14 may contain slots 13 for an annunciator display (not shown). A lock 60 is secured in door 14 at the edge opposite the attaching means 20.

Figure 2:
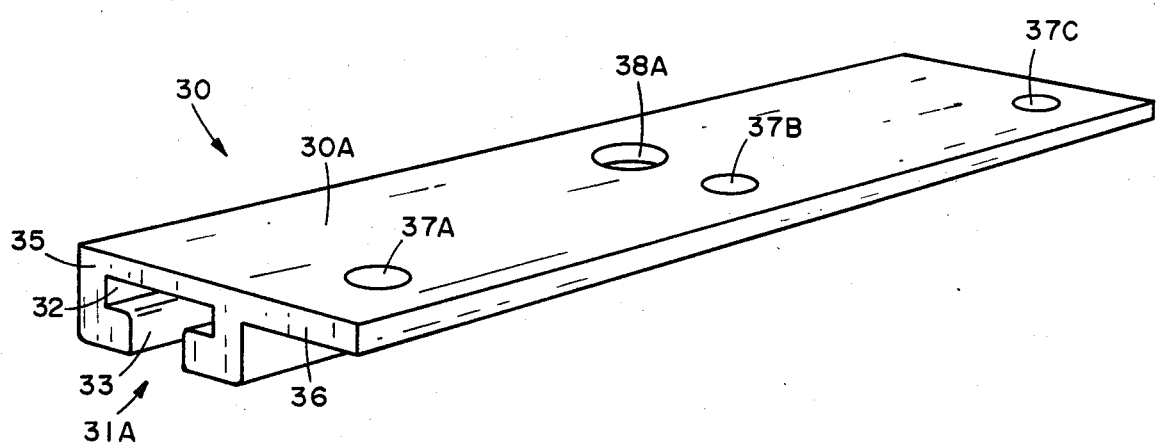
FIG. 2 is a detailed view of one of the tracks of the embodiment of FIG. 1.

FIG. 2 shows a detached view of a portion of the guide means 30 which in the preferred embodiment is a pair of elongated tracks 30A and 30B each having a t-shaped channel 31A and 31B along its length. Channel 31A includes a head portion 32 which is located interiorly of the track and a neck portion 33 which connects the head portion 32 and the exterior of the track 30A. Track 30A includes a rectangular body portion 35 and a flange extension 36. The flange 36 has holes 37A, 37B and 37C for mounting it on housing 10 and an aperture 38A large enough to pass the head of a screwdriver for fastening screw 41. Screws 39A, 39B, and 39C are screwed through holes 37A, 37B, 37C respectively to fasten track 30A to the top front edge 51 of housing 10 (FIG. 1). Track 30B is identical to track 30A and fastens similarly to the bottom front edge 52 of housing 10.

Figure 3:
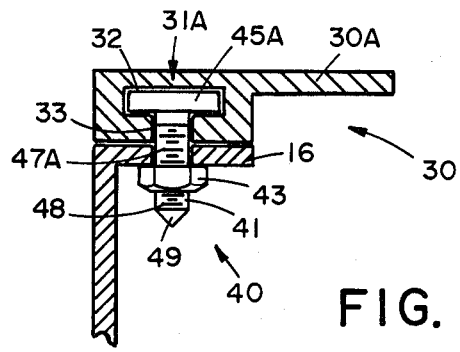
FIG. 3 is a detailed view showing the connection between the track, the screw, and the door of the embodiment of FIG. 1.

Turning now to FIG. 3, a detailed view of a portion of the guide means 30, attaching member 40 and door 14 is shown. In the preferred embodiment, the attaching member 40 includes screws 41 and 42, and nuts 43 and 44. Screw 41 includes a head portion 45A and a neck portion 47A. In the preferred embodiment screw 41 has cutting threads 48 and a pointed tip 49. The head portion 45A of screw 41 is of a suitable dimension to slide in the head portion 32 of channel 31A and neck portion 47A is proportioned to slide in neck portion 33 of the channel. Preferably, the screws 41 and 42 are No. 8 truss-head screws with self tapping threads and channel head portion 45A is 0.384 by 0.102 inches while neck portion 47A is 0.164 inches in diameter; preferably the head portion 32 of channel 31A is about 0.75 inches wide by 0.25 inches in height while neck portion 33 is about 0.125 inches high by 0.190 inches wide. Screw 41 is screwed through lip 16 of door 14 to fasten the door to the track 30A. Nut 43 is then tightened on threads 48 against lip 16 and serves as a jamming nut to lock the screw 41 in place. Similarly screw 42 attaches door 14 to track 30B and nut 44 locks screw 42 in place, and the head of screw 42 slides in the channel 31B of track 30B.

Figure 4:
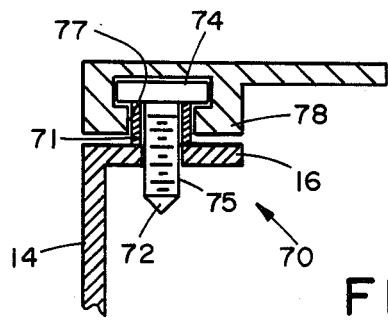
FIG. 4 is a detailed view of an alternative embodiment of the connection between the track, the screw, and the door.

An alternative embodiment of the attaching member 70 is shown in FIG. 4. In this embodiment a tube 71 is inserted over screw 72 between the door 14 and the screw head 74. Tube 72 is preferably formed of steel, has an inner diameter such that it fits slideably but without significant play about screw shank 75, an outer diameter that is just slightly smaller than the width of track opening 77 so that it slides easily in the track without significant play, and a length slightly longer than the thickness of the track neck 78; preferably the tube 71 dimensions are 0.187 inches outside diameter, a wall thickness of 0.010 inches and a length of 0.135 inches. The tube 71 acts as a stop to provide precise spacing between the door lip 16 and the bottom of the screw head 74. This prevents binding of the door on the track due to overtightened screws. In addition, tube 71 presents a smooth surface to the sides of track neck 78 which provides for smoother sliding and less track wear. This embodiment may or may not employ jam nuts.

Figure 5:
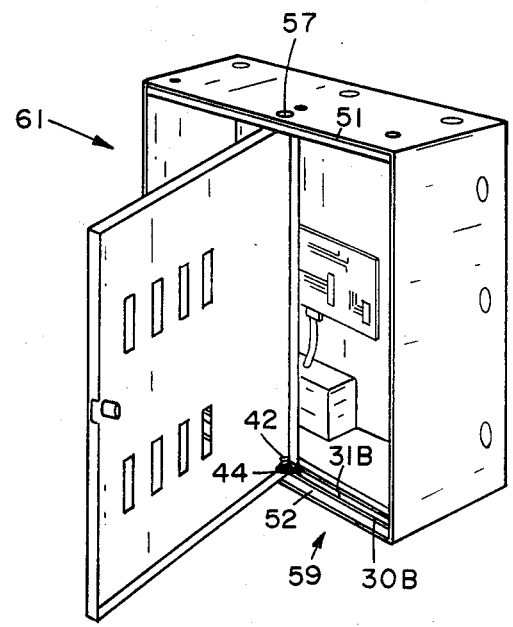
FIG. 5 is a front perspective view of the embodiment of FIG. 1 showing the door in the position in which it may be attached.
Figure 6:
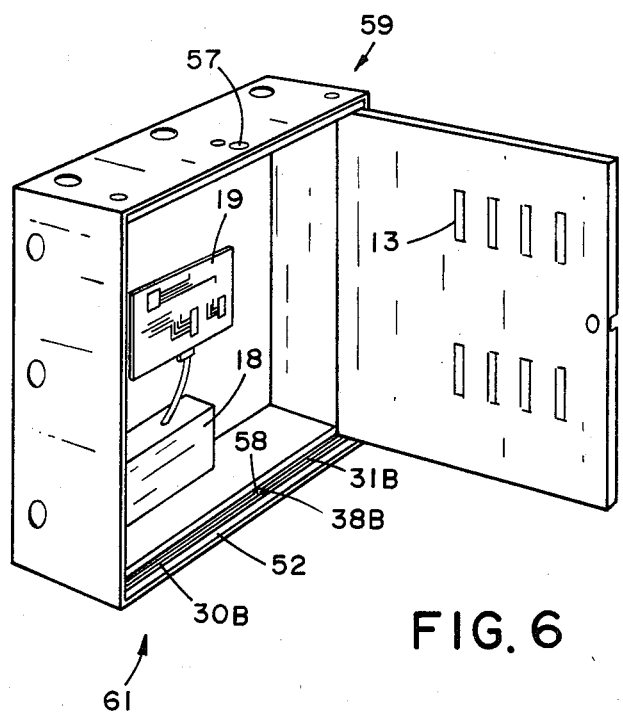
FIG. 6 is a front perspective view of the embodiment of FIG. 1 showing the door slid to the opposite side of the door opening.

It is a feature of the invention that screws 41 and 42 can only be inserted or removed when door 14 is located with the screws aligned with apertures 38A and 38B as in FIGS. 2 and 5–6. Housing 10 optionally may have apertures 57 and 58 in its top and bottom edges 51 and 52 respectively, which apertures are large enough to pass a screwdriver to facilitate installation of screws 41 and 42 respectively. Alternatively apertures 38A, 38B, 57 and 58 may be omitted and the door is then attached by fastening screws 41 and 42, inserting their heads in channels 31A and 31B and fastening the tracks 30A and 30B to housing 10. In this embodiment the door 14 may be removed only by removing tracks 30A and 30B.

In this preferred embodiment of the invention housing 10 and door 14 are formed from steel and tracks 30A and 30B of aluminum. Screws 41 and 42 and nuts 43 and 44 are preferably stainless steel or standard steel with corrosion resistant plating.

A feature of the invention is that door 14 may be slid from one side of the housing 10 to the other without detaching it from the housing. This permits the service person to place the door at the most convenient point with respect to housing 10 in order to service electronics 17. In FIG. 6 door 14 is shown slid to the opposite side 59 of the housing 10 from the side 61 at which it is located when the housing door is closed.

It is a feature of the invention that the slider-hinge of FIGS. 3 and 4 may be manufactured of inexpensive parts. Screws 41 and 42 and nuts 43 and 44 are inexpensive commodity items and tracks 30A and 30B are simple and operate well even when manufactured with low tolerances and thus are easily manfacturable, and tube 71 may be cut from common tube stock.

A novel fire alarm panel that is easily serviceable while meeting United Laboratories safety requirements has been described. It is evident that those skilled in the art may now make many uses and modifications of the specific embodiment described without departing from the inventive concepts. For example, other equivalent parts may be used. Consequently, the invention is to be construed as embracing each and every novel feature and novel combination of features present in the fire panel described.

What is claimed is:
1. A fire panel comprising:
a housing having an opening;
fire panel electronics within said housing;
a door closing said opening in said housing; and
attaching means attaching said door to said housing while permitting said door to be pivoted about one end and permitting the pivoted end of said door to be moved from one side of said opening to the opposite side without detaching it from said housing, said attaching means including means permitting the pivoted end of said door to be detached from said housing when said pivoted end is located in at least one location away from the side of said opening where said pivoted end is located when said door is closed, while preventing said pivoted end from being detached from said housing when said door is closed.

2. A fire panel as in claim 1 wherein said attaching means includes a guide means extending from said one side of said housing to said opposite side.

3. A fire panel as in claim 2 wherein said guide means comprises two elongated tracks, each track having a channel passing along its length, each channel having a head portion located in the interior of each of said tracks and a neck portion connecting said head portion and the exterior of each of said tracks, wherein said attaching means further includes two attaching members, each member having a head portion slidable within the head portion of one of said channels and a neck portion slideable in the neck portion of one of said channels, and wherein said attaching members are fastened to said door.

4. A fire panel as in claim 3 wherein said attaching members comprise screws having self-tapping threads fastening to said door.

5. A fire panel as in claim 4 wherein said attaching means further includes at least two jamming nuts locking said screws to said door.

6. A fire panel as in claim 4 wherein said means permitting includes at least one aperture in each of said tracks on the side opposite said neck portion of each said channel and away from the end of each of said tracks where said screws are located when said door is in the closed position, said aperture being large enough to insert a tool for fastening said screws.

7. A fire panel as in claim 3 wherein said attaching means further comprises a stop means fitting over said neck portion of each of said attaching members and extending between said head portion of said attaching members and said door.

* * * * *